United States Patent
Lemp, III

(10) Patent No.: US 6,570,506 B2
(45) Date of Patent: *May 27, 2003

(54) CELESTIAL OBJECT LOCATION DEVICE

(75) Inventor: Michael Lemp, III, Aliso Viejo, CA (US)

(73) Assignee: Yamcon, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/115,410

(22) Filed: Apr. 2, 2002

(65) Prior Publication Data

US 2002/0152620 A1 Oct. 24, 2002

Related U.S. Application Data

(63) Continuation-in-part of application No. 09/511,400, filed on Feb. 23, 2000, now Pat. No. 6,366,212.
(60) Provisional application No. 60/122,711, filed on Mar. 3, 1999.

(51) Int. Cl.⁷ .................................................. G08B 5/00
(52) U.S. Cl. ....................... 340/815.4; 340/999; 33/628; 701/13; 701/226
(58) Field of Search .............................. 340/815.4, 999; 701/13, 226, 207, 222, 300; 356/145, 146, 147, 139.04; 33/268; 250/203.1; 434/284, 289

(56) References Cited

U.S. PATENT DOCUMENTS

| | | |
|---|---|---|
| 2,372,487 A | 3/1945 | Hagner |
| 2,994,971 A | 8/1961 | Meisenheimer et al. |
| 3,257,728 A | 6/1966 | Blomquist |
| 3,769,710 A | 11/1973 | Reister .......................... 33/320 |
| 4,096,646 A | 6/1978 | Solem ............................ 35/43 |
| 4,104,722 A | 8/1978 | Evans .......................... 364/455 |
| 4,621,329 A | 11/1986 | Jacob .......................... 364/455 |
| 4,702,011 A | 10/1987 | Sigley .......................... 33/268 |
| 4,764,881 A | 8/1988 | Gagnon ....................... 364/559 |
| 4,938,697 A | 7/1990 | Mayer .......................... 434/289 |
| 4,944,587 A | 7/1990 | Harigae ...................... 356/152 |
| 4,970,793 A | 11/1990 | Alamian ....................... 33/268 |
| 5,003,698 A | 4/1991 | Vuarnesson .................. 33/268 |
| 5,133,050 A | 7/1992 | George et al. .............. 395/135 |
| 5,155,327 A | 10/1992 | Hoag .......................... 219/121 |
| 5,161,242 A | 11/1992 | Boulay ........................ 364/455 |
| 5,269,065 A | 12/1993 | Ida ............................... 33/269 |
| 5,311,203 A | 5/1994 | Norton ........................... 345/7 |
| 5,546,309 A * | 8/1996 | Johnson et al. ............... 701/13 |
| 5,574,465 A | 11/1996 | Okada ......................... 342/357 |
| 5,704,653 A | 1/1998 | Lee .............................. 283/34 |
| 5,815,411 A * | 9/1998 | Ellenby et al. ............... 701/13 |
| 6,056,554 A * | 5/2000 | Samole ........................ 701/13 |
| 6,172,747 B1 * | 1/2001 | Houlberg ............... 356/139.04 |
| 6,366,212 B1 * | 4/2002 | Lemp ..................... 340/815.4 |

* cited by examiner

Primary Examiner—Daniel J. Wu
Assistant Examiner—Davetta W. Goins
(74) Attorney, Agent, or Firm—K. David Crockett, Esq.; Crockett & Crockett

(57) ABSTRACT

A hand-held electronic celestial object-locating device assists in identifying a celestial object or directing a user to a desired celestial object. The device is useful for locating or identifying any celestial object including stars, constellations, planets, comets, asteroids, artificial satellites, and deep sky objects to name a few. The device utilizes sensors for 3-axis magnetic field and 3-axis gravitational field detection. The device utilizes a processor and an electronic database to perform the required calculations. The device's database may be updated through access to the Internet through which the updates may be purchased.

12 Claims, 5 Drawing Sheets

CELESTIAL OBJECT LOCATION DEVICE

RELATED APPLICATIONS

This application is a continuation in part of U.S. application Ser. No. 09/511,400, filed Feb. 23, 2000, now U.S. Pat. No. 6,366,212, which claims priority to U.S. Provisional Application No. 60/122,711, filed Mar. 3, 1999.

FIELD OF THE INVENTIONS

This invention relates to astronomy, specifically to an electronic device capable of locating and identifying celestial objects.

BACKGROUND OF THE INVENTIONS

People have always been fascinated with the heavens. They have been cited for the origins of the universe and life. Stars and constellations are the basis of fables, myths, and stories in almost every culture on the earth. The stars are used as indicators of peoples, future by some. Sailors and other travelers rely on certain stars and constellations as indicators of position and direction. Further, there is an enormous amount of professional and hobbyist interest in the stars.

Both professionals and hobbyists use celestial object identifying devices to locate a star, constellation, planet, comet, asteroid, artificial satellite, deep sky object or other heavenly objects, which shall be referred to collectively as celestial objects. Some existing celestial object identifying devices function by using a combination of mechanical electrical or pre-tabulated charts or tables.

U.S. Pat. No. 3,863,365 to Moliard discloses a method which uses a flat spinning disc that contains a pictorial representation of a celestial hemisphere containing constellations and stars. The user must rotate the disc to the current time and date, and then orient himself or herself with the proper compass direction. Identification of a celestial object is attempted by the user comparing the sky with the celestial hemisphere pictorial representation. This method proves rather difficult to locate a celestial object, in that the sky and the pictorial representation of the celestial hemisphere are two different scales. Additionally, the disc contains a flattened perspective of the celestial hemisphere making it difficult to judge at what angle of declination one would locate the desired celestial object. Further, the sky contains many more celestial objects than the pictorial representation can possibly contain, making it difficult to determine which pattern of stars on the pictorial representation corresponds to a particular region of the sky.

U.S. Pat. No. 5,704,653 to Lee discloses a pictorial representation of the celestial hemisphere in which is incorporated an electronic compass. The electronic compass identifies which region of the sky the operator of the Lee device is facing. The compass assists in pointing to the approximate azimuth of the celestial object. However, the task of determining the proper declination, and performing a mental translation from a set of maps, to the particular region of the sky one is observing, is still handled unaided by the operator. This leaves most of the work in locating a celestial object to the operator.

U.S. Pat. No. 4,938,697 to Mayer contains a somewhat clumsy and complicated mechanical method of directly observing a region of the sky without a map. It requires a good deal of understanding of the devices workings to obtain any success. In addition, it can only locate a star-group or constellation.

U.S. Pat. No. 4,970,793 to Atamian contains a method for location of stars and constellations, yet it requires manual alignment of a sphere oriented with the sky to work properly. It also has the same scale difference problem mentioned above in regard to U.S. Pat. No. 3,863,365 and leaves much ambiguity in observing heavenly bodies.

Thus, there is a need for a more user-friendly device to locate celestial objects.

SUMMARY

An improved celestial object-locating device has been discovered. In an aspect of the invention, a device allows a user to point the device at a celestial object and the device announces to the user of the celestial object's identity. In another aspect of the invention, the user directs the device to find a desired celestial object. This is done through a view port and the instrument detects the geographical location or position of the user, the time, and the azimuth and nadir of the direction of the view port automatically, resulting in a simple to use celestial object location device. Other embodiments of the invention comprise combinations of the above aspects. These aspects of the invention eliminate the disadvantages of the prior art concerning scale and translation from a celestial map. Further, in an aspect of the invention, the device is hand-held or attached to a computational device such that the device is portable.

In an aspect of the invention, a celestial object location (COL) device or for viewing from a location at a time and a date comprises a means for viewing an object (a viewing means), a processor, a 3-axis magnetic sensor, a 3-axis gravitational sensor, a location means, a time means, and a database. The viewing means assists a user of the COL device in observing along a viewing axis defined by an azimuth angle and a nadir angle. The 3-axis magnetic sensor is adapted to provide the processor with azimuth data representing the azimuth angle. The 3-axis gravitational sensor is adapted to provide the processor with nadir data representing the nadir angle. The locations means provides location data representing the location to the processor. The time means provides time and date data representing the time and date to the processor. The database is adapted to be accessed by the processor and provide data such that the processor determines celestial coordinates of right ascension and declination corresponding to the viewing axis based on the azimuth data, the nadir data, the location data, and the time and date data.

In a further aspect of the invention, the viewing means comprises a viewing channel adapted to enable a user to observe through the device along the viewing axis.

In a further aspect of the invention, there is a direction indicator adapted to announce directions to change the angular orientation viewing axis, wherein the direction indicator is further adapted to be controlled by the processor and comprises a visual indicator, an auditory indicator, or a tactile indicator.

In a still further aspect of the invention, the direction indicator is adapted to be controlled by the processor, comprises an illuminate-able visual display that is viewable by the user when the user is observing through the viewing channel, and is adapted to illuminate at least a portion of the visual display such that a user changes the viewing axis based, on the illuminated visual display. The visual display may be a circularly arranged series of illuminate-able arrows, wherein the processor and the arrows are adapted such that the processor directs a least a portion of the arrows to be illuminated.

In an aspect of the invention, a reticule is present and adapted to be viewable by the user when the user is observing through the viewing channel.

In an aspect of the invention, the viewing means comprises a display screen adapted to display an image observed along the viewing axis. Furthermore, there may be a direction indicator adapted to announce directions to change the angular orientation viewing axis, wherein the direction indicator is further adapted to be controlled by the processor and comprises a visual indicator, an auditory indicator, or a tactile indicator.

In an aspect of the invention, the device comprises a housing and wherein the viewing means comprises a viewing channel extending through the housing and adapted to permit a user to observe through the viewing channel along the viewing axis. In a further aspect of the invention, the processor is spaced apart from the housing. In an additional aspect of the invention, the housing is adapted to be held by the user while the user is observing through the viewing channel.

In a further aspect of the invention the COL device comprises a direction indicator adapted to announce directions to change the angular orientation of the viewing axis, wherein the direction indication is further adapted to be controlled by the processor and comprises a visual indicator, an auditory indicator, or a tactile indicator. This COL device may further comprise a user interface adapted for the user to input an identification of a celestial object or celestial coordinates to the processor. Additionally, the processor and the database is adapted such that the processor directs the user via the direction indicator to change the angular orientation of the viewing axis such that the viewing axis is aligned with the celestial object or the celestial coordinates, wherein the data base comprises data associating the identification of the celestial object with the celestial object's celestial coordinates.

In still further aspects of the invention, the processor is adapted to announce to the user via the direction indicator that the viewing axis is aligned with the celestial object or the celestial coordinates. Additionally, the user interface may be adapted for the user to input an identification of a celestial object comprising multiple celestial coordinates. In this case, the processor and the database is adapted such that the processor directs the user via the direction indicator to change the angular orientation of the viewing axis such that the viewing axis is serially aligned with the multiple celestial coordinates of the celestial object, thereby the user is provided with a tour of the celestial object. In a still further aspect of the invention, the user interface is adapted for the user to input a signal to the processor to direct the user via the direction indicator to change the angular orientation of the viewing axis from a current celestial coordinate to a next multiple celestial coordinate.

In a further aspect of the invention, there is a user interface adapted for the user to signal to the processor to identify a celestial object or celestial coordinates aligned with the viewing axis, wherein the database is adapted for the processor to access the database for data related to the celestial object or the celestial coordinates. The user interface is further adapted to announce to the user the celestial object or the celestial coordinates. In a still further aspect of the invention, the user interface is adapted for the user to signal to the processor through activating a manual switch or through an auditory command, and for the processor to announce to the user through a visual display or a speaker.

In a further aspect of the invention, the database is adapted to be changed by the user editing the database through a user interface of the device in functional communication with the processor, a plug-in module adapted to be in functional communication with the processor, or an information transfer system adapted to be in functional communication with the processor.

In an aspect of the invention, the location means comprises a user interface adapted for the user to input location information to the processor, wherein the database is adapted to provide the processor with the location data based on the inputted location information.

In an aspect of the invention, the time means comprises a time keeping device adapted to provide the time and date data to the processor.

In an aspect of the invention, the location means and the time means comprises a global positioning device adapted to provide the location data and the time and date data to the processor.

In an aspect of the invention, there is an output device for announcing the elevation angle of the viewing axis, wherein the elevation angle is nadir angle minus 90 degrees. In an aspect of the invention, there is an output device for announcing a compass heading as a function of the azimuth angle and the nadir angle.

In an aspect of the invention, there are compensation instructions readable by the processor and/or compensation data in the database such that the processor compensates for procession, earth elongation, magnetic variation, parallax, nutation, or a combination thereof.

In an aspect of the invention, there is a temperature sensor adapted to interface with and enable the processor to make thermal error compensations of the magnetic and gravitational sensors.

In an aspect of the invention, the database contains additional data representing when a celestial object is visible to a naked eye at the location, the device further comprises an announcement device functionally connected to the processor, and the processor is adapted to announce through the announcement device the additional data representing when the celestial object is visible to a user at the location. In an aspect of the invention, there is a celestial object location device for use from a location at a time and a date comprising:

a. a housing comprising a viewing channel adapted for a user to observe through the viewing channel and along a viewing axis to a position in the sky aligned with the viewing axis, wherein the housing is adapted to be held by the user while the user is observing through the viewing channel;
   b. a processor;
   c. a 3-axis magnetic sensor adapted to provide the processor with azimuth data representing an azimuth angle of the viewing axis;
   d. a 3-axis gravitational sensor adapted to provide the processor with nadir data representing a nadir angle of the viewing axis;
   e. a location data input device adapted to provide the processor with location data representing the location of the celestial object location device;
   f. a time data input device adapted to provide the processor with time and date data representing the time and date of a use of the device;
   g. a user interface for inputting user data to the processor and announcing information to the user;
   h. a direction indicator adapted for the processor to announce through the direction indicator to the user directions for changing the angular orientation of the viewing axis; and l. a database adapted to be accessed by the processor such that the processor, based on the azimuth data, the nadir angle, the location data, the time and date data, the user data, and the database, announces to the user:
  i) through the user interface an identification of a celestial object aligned with the viewing axis;
  ii) through the user interface celestial coordinates aligned with the viewing axis; or
  iii) through the direction indicator directions for the user to change the viewing axis based on user data comprising identification of a celestial object or a celestial coordinate.

In a further aspect of the invention, the processor is spaced apart from the housing.

In a further aspect of the invention, the direction indicator comprises a circularly arranged series of illuminate-able arrows that are in functional communication with the processor, the arrows being adapted such that illuminated arrows are visible by the user observing through the viewing channel, and the direction indicator and the processor are adapted to illuminate at least a portion of the arrows such that a user changes the angular orientation of the viewing axis based on the illuminated portion of the arrows.

In a further aspect of the invention, the database is, adapted to be changed by the user editing the database through the user interface, a plug-in module adapted to be in functional communication with the processor, or an information transfer system adapted to be in functional communication with the processor.

In an aspect of the invention, there is a process for observing celestial objects comprising the steps of:
  a. providing a user with a device for observing the celestial objects along a viewing axis;
  b. identifying an azimuth angle of the viewing axis via a 3-axis magnetic sensor adapted to determine the azimuth angle;
  c. identifying a nadir angle of the viewing axis via a 3-axis gravitational sensor adapted to determine the nadir angle; and
  d. determining celestial coordinates of right ascension and declination based on the azimuth angle, the nadir angle, a location of the device, and a current time and date.

In a further aspect of the invention, the providing step further comprises a step of holding the device, the 3-axis magnetic sensor, and the 3-axis gravitational sensor in a hand of the user. In a still further aspect of the invention, the 3-axis magnetic sensor and the 3-axis gravitational sensor are integral to the device.

In a further aspect of the invention, there is a step of directing a processor to receive data representing the azimuth angle, the nadir angle, the device location, and the current time and date, consult a database, and announce the celestial coordinates via an announcement device.

In a further aspect of the invention, there is the step of inputting to a processor an identification of a desired celestial object wherein the processor is also directed to perform the determining the celestial coordinates step. Further, there is a step of directing the processor to announce, via a direction indicator, instructions understandable to the user concerning how to change the angular orientation of the viewing axis until the desired celestial object is aligned with the viewing axis. In a still further aspect of the invention, there is the step of repeating the directing the processor to announce step such that the user is instructed to tour through portions of the desired celestial object.

In a further aspect of the invention, there is the step of inputting to a processor a desired celestial coordinate wherein the processor is also directed to perform the determining the celestial coordinates step. There is also the step of directing the processor to announce via a direction indicator instructions concerning how to change the angular orientation of the viewing axis until the desired celestial coordinate is aligned with the viewing axis.

In an aspect of the invention, a process of observing a celestial object comprises the step of providing an embodiment of the invention described in this disclosure and the step of updating the database with additional data concerning the celestial object such that a user of the device directs the processor to announce the directions to change the angular orientation of the viewing axis such that the viewing axis is aligned with the celestial object via the direction indicator. In a further aspect of the invention, the updating step comprises, the step of functionally connecting a plug-in module comprising the additional data to the device or the step of downloading the additional data to the database via an information transfer system. The downloading step may comprise the step of accessing the Internet to retrieve the additional data. Further, the accessing step comprises the step of purchasing the additional data.

DETAILED DESCRIPTION OF THE INVENTIONS

Figure 1:
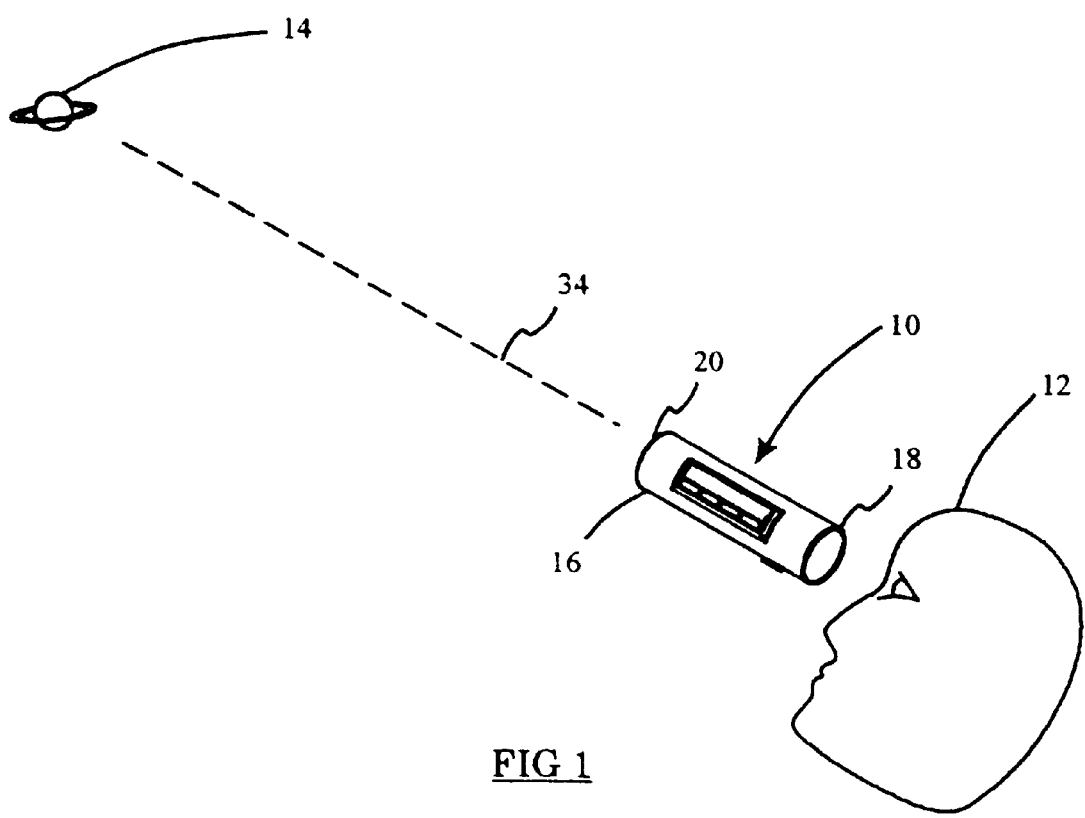
FIG. 1 is a schematic perspective view of a user identifying a celestial object with a device according to an embodiment of the invention.

Referring now to the figures, wherein like reference numerals refer to like elements throughout the figures, and specifically to FIG. 1, a celestial object location device (COL device) 10 is being used by a user 12 to locate a celestial object 14. The COL device 10, according to the shown and a preferred embodiment of the invention, has a generally cylindrical housing 16 adapted to be hand-held. Other embodiments of the invention may have housings of other shapes and may or may not be hand-held. Non-limiting examples of such embodiments naturally include telescopes, binoculars, eyepieces, headpieces, and any means for viewing objects. Thus, different embodiments of the object location device can themselves magnify distant objects. In the case of a headpiece, a retinal location sensing device can be used to further determine in what direction the user's eye is pointed. Thus, the user can simply look at an object and the object locator will then identify what the user is looking at.

The housing 16 of the COL device 10 has a first view port 18 that is held proximate to the user 12 and a second view port 20 proximate to the celestial object 14. During use, the view ports 18 and 20 are aligned between the user 12 and the celestial object 14 and the COL device 10 is adapted such that the user views the celestial object through the, COL device along a viewing axis 34.

Other embodiments of the invention may have an optical sensor that is positioned to view the celestial object 14 and transmit an image from the optical sensor to a view screen such that the user observes the image on the screen (not shown). In further embodiments of the invention, the COL device 10 is mounted to a support or a frame and is adapted to be positioned mechanically, electronically, pneumatically, or by some other suitable means other than by direct manual manipulation (not shown). The positioning of the mounted COL device 10 may be directed by the user through switches, by a functionally integrated computational device, or a combination of both. Still further embodiments of the invention may have the COL device 10 mounted to a support or a frame and may be positioned through direct manual manipulation, thereby providing stability to the device (not shown).

Figure 2:
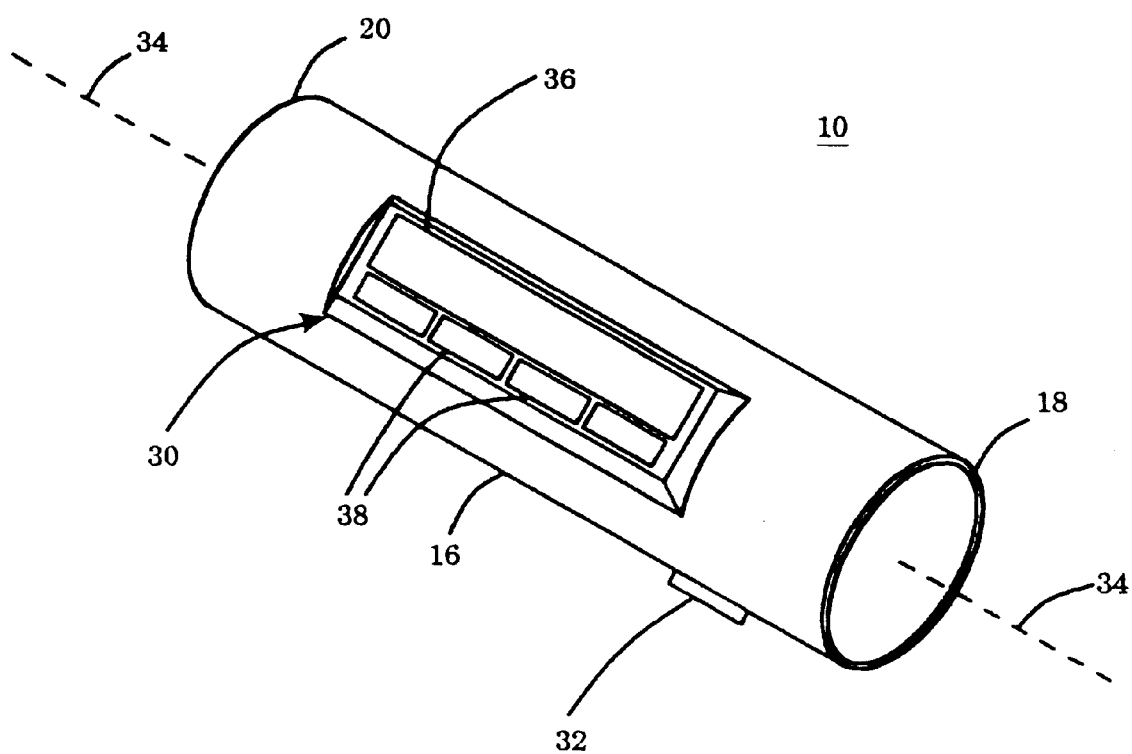
FIG. 2 is a detail perspective view of the device shown in FIG. 1.

Referring now to FIG. 2, the COL device 10 comprises the housing 16, the view ports 18 and 20, and a data input/output interface (101) 30, and a viewing button or switch 32. A viewing axis 34 is shown extending axially through the cylindrical housing 16. The IOI 30 is comprised of a display screen 36 for displaying data, such as in the form of menus and results, as explained further below. The IOI 30 also comprises a plurality of buttons or switches 38 for inputting data and commands, such as moving through menus on the display screen 36 and inputting queries. The viewing switch 32 is positioned and adapted to be easily activated by the user's thumb or finger when the user is observing through the COL device 10.

Figure 3:
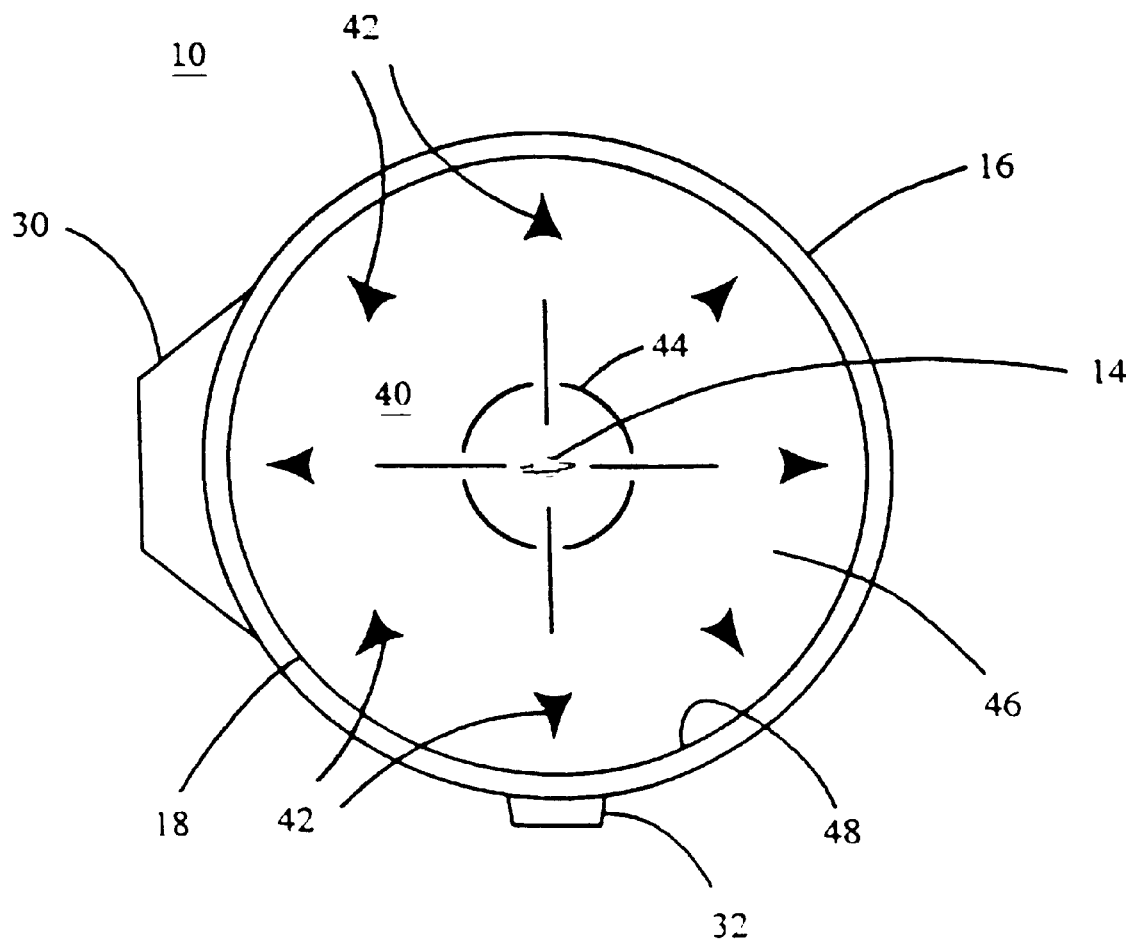
FIG. 3 is a view through the device shown in FIG. 1 while observing a celestial object.

Referring now to FIG. 3, the COL device 10 is shown displaying the view the user has when the celestial object 14 is aligned with the viewing axis 34 of the device 10. The user 12 is observing the object 14 through a viewing channel 46 that extends through the COL device 10. The viewing channel 46 is defined by an interior surface 48 of the housing 16 in the shown embodiment. Further, the viewing channel 46 is bounded by the view ports 18 and 20.

Shown extending from the left side of the housing 16 is the IOI 30 and shown extending from the bottom of the housing is switch 32. Other embodiments of the invention may have other configurations of the IOI 30 and the switch 32.

Referring now to a viewing portion 40 of the COL device 10, a circularly arranged series of illuminating directional arrows 42 are positioned adjacent to the interior surface 48 of the housing 16. The arrows 42 are illuminated as required to direct the positioning of the COL device 10 during use. Eight arrows 42 are shown but other embodiments of the invention may have more or less arrows. The size, shape, and number of the illuminating arrows 42 are not paramount to the function performed. Though there is a way for the COL device 10 to inform the user 12 of a required change in viewing axis to align the device with a particular location in the sky and, therefore, the arrows 42 are direction indicators. There are many variations on color and shape of the direction indicators as well. The illumination of the arrows 42 may be accomplished by any suitable means, such as by LEDs or by fiber optics. In an embodiment of the invention, the arrows are not an overlayed image. Other embodiments of the invention may have other suitable ways of informing the user how to direct the COL device 10, such as with illuminating dots or borders.

Embodiments of the invention have many variations on the operation of the arrows 42 or other suitable direction indicators. In embodiments of the invention, the arrows 42 blink at different rates, change color, or intensity depending on how far the user 12 has to angularly change, the viewing axis 34. For example, if the user 12 is very close to the desired viewing axis position, the arrow or arrows 42 blink quickly and if the user were further away the arrow or arrows 42 may blink slowly. Other embodiments of the invention may use tactile, such as vibrational, or auditory means for announcing direction.

In another embodiment of the invention, once the viewing axis 34 is aligned with the desired celestial object 14, the arrows 42 may all light up or blink. Still other embodiments of the invention may have devices that announce visually, tactilely, or auditorily when the desired angular position of the COL device 10 is achieved, such as sounding a beep or synthesized voice.

A reticule 44 is centrally positioned in the viewing portion 40. The reticule 44 is helpful in centering the COL device 10 on the celestial object 14. Other embodiments of the invention may have other reticule or cross-hair designs or not have any means for centering the celestial object 14. In still other embodiments of the invention, the reticule 44 may be used to announce achievement of a desired angular position either by illuminating with more intensity, ceasing illumination, or flashing.

Figure 4:
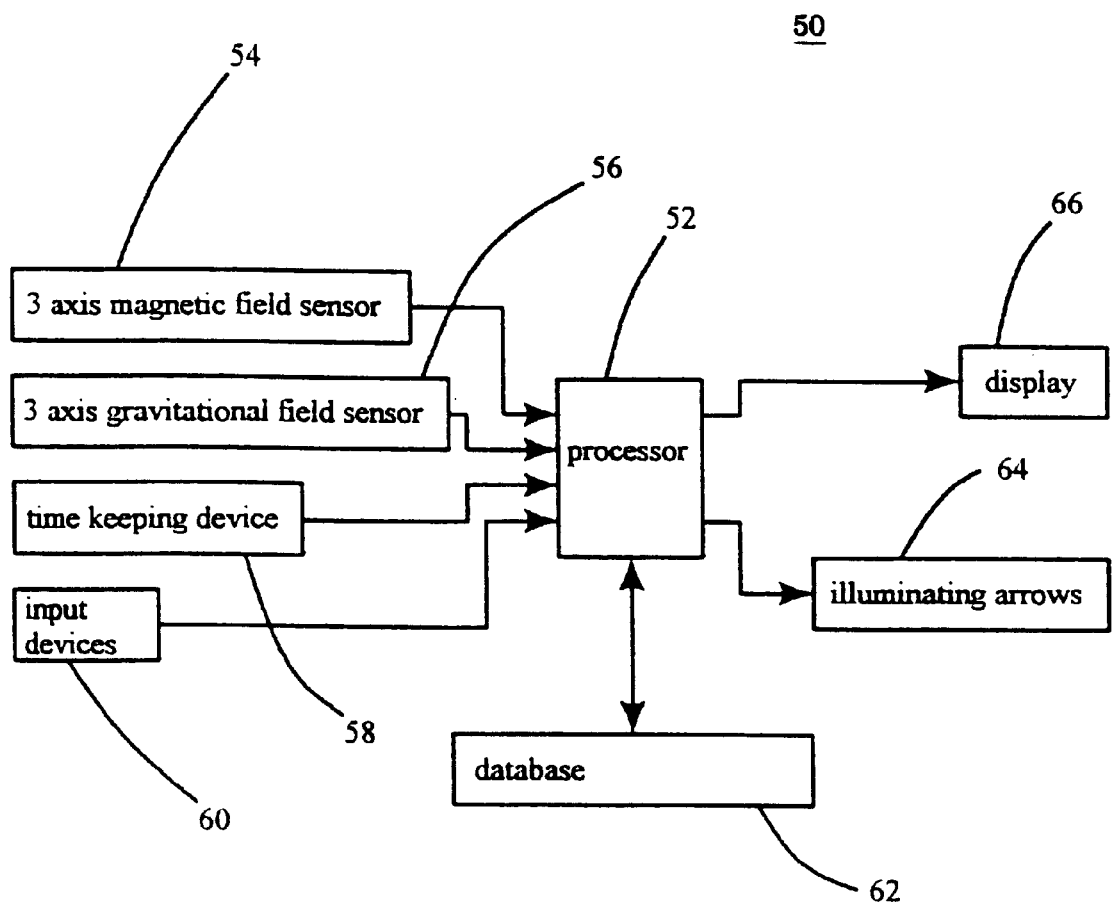
FIG. 4 is a schematic representation of the components of the device shown in FIG. 1.

Referring now to FIG. 4, incorporated into the COL device 10 are a number of other components to operate the device as shown in schematic representation 50. In the shown embodiment, a processor 52 integrates the components which comprise a 3-axis magnetic field sensor 54, a 3-axis gravitational field sensor 56, a time keeping device 58, input devices 60, a celestial object database 62, illuminating arrows 64, and a display 66, which are arranged in a counterclockwise fashion starting at the top left corner of FIG. 4. In a preferred embodiment of the invention, the components are incorporated into the housing 16 of the COL device 10. The 3-axis magnetic field sensor and time keeping devices are available from a variety of vendors. The 3-axis magnetic sensor comprises a means for measuring a magnetic field. The 3-axis gravitation sensor comprises a three-axis accelerometer or comprises three separate orthogonal accelerometers, each aligned along one of the three co-ordinate axes. In either embodiment the 3-axis gravitation sensor comprises a means for detecting a gravitational field or a means for detecting the nadir angle. Together, the 3-axis magnetic field sensor and the 3-axis gravitation sensor comprise a means for determining the orientation of the object locator and together the gravitation and magnetic sensors produce orientation data reflecting the orientation of the object locator.

Alternatively, the 3-axis gravitation sensor (or 3 orthogonal single axis gravitation sensors) and the 3-axis magnetic field sensor can be replaced with at least two gyroscopes, along with sensors capable of measuring the change in inertia of the gyroscopes. The gyroscopes and inertial sensors comprise a means for measuring the inertia of the object locator and also comprise a means for determining the orientation of the object locator. In addition, the gyroscopes and inertial sensors produce orientation data reflecting the orientation of the object locator. The means for measuring inertia is first calibrated using a gravitational sensor, a magnetic sensor, or manually by the user. Then, as the user moves the object locator, the gyroscopes feel a force with a vector proportionate to the direction of movement. This information can be used to determine in which direction the object locator is pointing. Thus, the object locator can detect both the azimuth angle and the nadir angle. The means for measuring inertia is adapted to provide a processor with azimuth data representing the azimuth angle and with nadir data representing the nadir angle. The processor then uses both sets of data to calculate the values of right ascension and declination. Together the values of right ascension and declination, or the values of the azimuth angle and nadir angle, comprise orientation data. A processor then compares the orientation data, along with the current time, the current date, and the position of the object locator on the Earth, to a database of objects in order to identify the object at which the locator is pointed.

In addition, the object locator uses at least one global positioning satellite system reader to determine the location of the user. One reader can determine the location of the user. However, the precise orientation of the user may be determined with two or more readers. Thus, two readers can determine both the azimuth angle and nadir angle. Thus, one embodiment of the object locator replaces the data from the magnetic field sensors and the gravitational field sensors with the data gained from multiple global positioning satellite system readers. In any case, at least one global positioning satellite system reader comprises a means for locating the object locator. At least two global positioning satellite system readers comprise a means for determining the orientation of the object locator and the at least two readers produce orientation data reflecting the orientation of the object locator.

Figure 5:
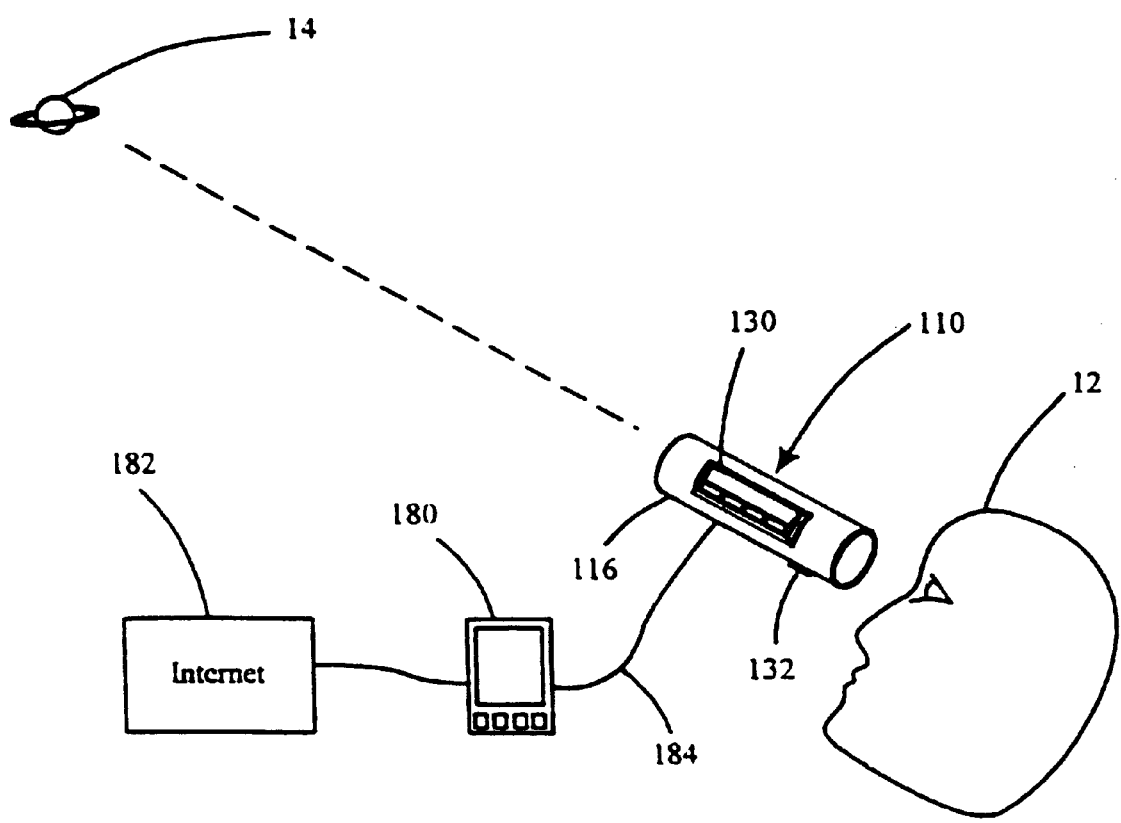
FIG. 5 is a schematic view of an embodiment of the invention incorporating a digital personal assistant.

Referring now to FIG. 5 as well, in other embodiments of the invention, a COL device 110 may comprise a portion external to the housing 116 comprising one or more of the components, such as the processor 52 and/or the database 62 residing in an auxiliary device 180 that is in functional communication with the remainder of the components. Examples of suitable auxiliary devices include a personal digital assistant, a desktop computer, or a laptop computer; however, embodiments of the invention are not limited to these examples. Therefore, in embodiments of the invention, the processor is spaced apart from the housing. Other embodiments of the invention incorporate the time keeping device 58, the input devices 60, and/or the display 66 into the auxiliary device 180. Still other embodiments of the invention have multiple auxiliary devices. It is understood that the term "auxiliary device" in the below claims is to be interpreted as encompassing one or more auxiliary devices.

In another embodiment of the invention, the configuration of the COL device 10 may not require the IOI 130 or the switch 132 and the input and output of data may be accomplished by the auxiliary device 180. In another embodiment of the invention, the database 62 may be communicated to through an information transfer system, such as a network system, connection to another database, or via the Internet 182. The components in the housing 16 and the auxiliary device 180 may be in functional communication through a physical conduit 184 capable of data transfer, such as electrical or optical signal transfer media, or by a process not requiring a physical conduit, such as processes utilizing infrared or RF technology, for example.

Referring back to FIG. 4, input devices 60 enable the user to input data into the processor 52. In the embodiment of the invention shown in FIG. 1, the input devices 60 correspond to the IOI switches 38 and the switch 32. Other embodiments of the invention may have data input devices of any suitable type, such as auditory for example, or the data input devices may be incorporated into the auxiliary device 180.

The processor 52 is in communication with the celestial object database 62 in order to retrieve information, or at least one fact, about celestial objects therefrom. The information in the databases of the embodiments of the invention may differ, but those skilled in the art understand the variety of information that may be in the database. The database 62 may also contain retrievable data for any other suitable purpose, such as linking a geographical location with a latitude and a longitude coordinate.

The processor 52 analyzes the input from the sensors 54 and 56, the timekeeping device 58, the input device 60, communicates with the database 62 as required, and outputs information through the arrows 64 and the display 66, which corresponds to the IOI display 36 of the embodiment shown in FIG. 1.

The processor 52 receives information from the magnetic field sensor 54 and the gravitational field sensor 56 in order to calculate the direction or vector that the COL device 10 is pointing. The vector is a three dimensional vector relative to the azimuth angle and the nadir angle of the COL device 10. The azimuth angle is the angle, between magnetic north and the device pointing direction. The nadir angle is the angle between straight down into the earth and the device pointing direction. The azimuth vector is determined using the magnetic field sensor 54 and the nadir angle is determined using the gravitational field sensor 56. The information from the sensors is processed by the processor 52 using means commonly known by those skilled in the art.

The 3-axis gravitational sensor 56 is used to determine the position of the nadir angle. The nadir angle is the three dimensional angle between two particular vectors. The first vector is in the direction, which the viewing axis 34 is pointed. The second vector is pointing straight into the ground, towards the center of mass of the earth. In a preferred embodiment of the invention, the 3-axis gravitational sensor will employ a minimum of three individual accelerometers to determine the 3-axis gravitational field vector, although other embodiments of the invention may use devices other accelerometers. The accelerometers used must be capable of sensing a static force, in this case the earth's gravitational force of 1 g. These types of accelerometers are readily available devices offering ample precision to perform this function. In an embodiment of the invention, the three individual accelerometers are oriented orthogonally (90 degrees) from each other in the x, Y, and Z planes. Through common geometric calculations the individual readings from the three accelerometers can be combined to yield the nadir angle.

Without at least three accelerometers in the 3-axis gravitational sensor 56, in contradistinction to Norton which discloses the use of one or two accelerometers, there can be large errors in the accuracy of the COL device 10. These errors would be dependant on what angle the user 12 held the COL device 10 and how they oriented the 'roll' axis of the device. In a device which only uses the earth's magnetic field, and the earth's gravitational field is used to sense orientation, the only way to avoid these errors is by using 3-axis sensors for measuring the magnetic field and the gravitational field. These errors cannot be ignored, as they may easily be larger than one field of view, that would render the COL device 10 useless.

Once the direction vector of the COL device 10 is determined, the processor 52 uses longitude, latitude, local time and date data of the COL device 10 to perform a translation of the device direction vector into celestial coordinates. In an embodiment of the invention, the longitude and latitude data is manually input by the user via the input devices 60. The longitude and latitude may be in the form of coordinates, but may also may be indirectly input by the user 12 entering another geographical indicator into the COL device 10, such as a town, county, zip code, portion of a state, state, or region of the county, in which case the database 62 or another database contains the information to assist in determining the longitude and latitude of the device 10. The local time and date may be inputted manually as well, but in a preferred embodiment of the invention, the time keeping device 58 inputs this information to the processor 52.

In another embodiment of the invention, the COL device 10 includes a global positioning system receiver (not shown) or any other suitable device for automatically inputting the longitude, latitude, time and date information, or portions thereof, to the processor 52.

The processor takes the direction vector information, received from the sensors 54 and 56, the time and date information from the time keeping device 58, and the information from the user via the input devices 60. This information is used by the processor 52 to perform a search against the database to determine the celestial coordinates of right ascension and declination to which the viewing axis 34 is pointing. Embodiments of the invention have one or numerous functions to perform at this point, as discussed below.

Identification of a Celestial Object.

Referring now to all the figures, the user 12 points the COL device 10 to a celestial object 14 whose identification is desired. More specifically, the user aligns the center of the viewing portion 40 with the celestial object 14, such that the viewing axis 34 is aligned with the object 14. The user activates the switch 32 to input to the processor 52 that the object 14 has been located. The processor 52 then receives the data from the sensors 54 and 56, the time and location data, consults the database 62, and displays on the screen 36 the information about the celestial object 14.

Location of a Celestial Object

Another common mode of operation that the COL device 10 supports is to help the user 12 locate the celestial object 14 in the sky. For example, if the user 12 wants to know where Saturn is currently located they would use the "locate" mode. To locate the desired celestial object, the operator selects Saturn from a list of available objects via the IOI 30. Then, the user 12 views through the COL device 10. The processor 52 directs the user to change the orientation of the COL device via the illumination of the arrows 42. For example, if the viewing axis 34 needs to be oriented more vertically and to the left, the arrows 42 in the upper left quadrant of the view portion 40 will light up. Once the desired celestial object, Saturn, is aligned with the viewing axis 34, all of the arrows 42 will not be illuminated, may blink or the device may utilize another suitable device for announcing to the user 12 that alignment has occurred.

In an embodiment of the invention, the COL device 10 may track the ecliptic for the user. An example of an ecliptic is the plane of the earth's orbit as it forms an imaginary arc across the sky during rotation about the sun. This arc can be traced using the illuminated arrows 42 as a guide. Further embodiments of the invention may track paths of other celestial objects, such as comets and satellites.

Tours of Constellations and Sky Tours

Since many constellations cover large areas of the sky and include multiple stars, an embodiment of the COL device 10 gives a tour of the constellation. In an embodiment of the invention, the constellation is chosen and input through the IOI 30. The COL device 10, through the arrows 42 directs the user 12 to align the viewing axis 34 with the brightest star in the constellation. Once the alignment is achieved and the COL device 10 indicates it, the user activates the switch 32, and COL device directs the user to the next brightest star in the constellation. This process continues until the stars of the constellation have all been aligned with the viewing axis 34 in a serial fashion, from a current celestial coordinate associated with a current celestial object to a next celestial coordinate associated with a next celestial object. Similarly, sky tours of celestial objects may also be included in an embodiment of the invention, such as a sky tour of the Zodiac constellations.

The tutorial in the database may contain information for stars and planets expected to be located with the device, and this information may include astronomical, astrological, or mythological stories from well-developed astrological and mythological bodies of information from many different cultures, such as ancient Greek, Mexican, Chinese, Indian, Babylonian, Egyptian, and North American Indian cultures, or even new fictional mythologies from science fiction or game databases. To access the astronomical, astrological, or mythological database information (or correlated information to a given object), a user having once located and sighted a star, planet, or other celestial object can initiate playback of audio data with a simple trigger, and a computer associated with the device and the database can first determine the celestial object sighted (from the orientation data), and then activate a switch, such as further activation of switch 32 or activation of an additional switch so as to initiate audio playback of information in the astrological or mythological database relevant to the celestial object sighted. The audio playback is accomplished by a speaker or other means for playing audio data. Additionally, the trigger may be an automated trigger initiated by the devices' alignment on a celestial object of interest. Alternatively, the trigger can initiate a video playback of correlated information on a display mounted on the object locator, external to the object locator (if connected to another means for displaying video), or within the object locator's viewing axis.

Other Modes of Operation

Embodiments of the invention may have several other modes of operation which are possible based on the instrumentation in the COL device 10. The COL device 10 may function as a digital compass and display the compass heading. In an embodiment of the invention, the COL device 10 uses both the azimuth and nadir data to compensate for when the COL device is not held parallel to the ground.

The COL device 10 may function as an elevation angle instrument, and display the elevation angle. The COL device 10 may display the celestial coordinates to which it is pointed. This last mode of operation is useful for an astronomer who has the celestial coordinates of an object (from a table or chart) which is not already in the device's database. The COL device 10 may display the date and time in various time standards including local, UT or GMT times.

In other embodiments of the invention, the COL device 10 may perform a series of compensations to improve the accuracy of the instrument. These include but are not limited to: procession (earth axis wobble), earth elongation (earth not completely circular), magnetic variation (difference between true north pole and magnetic north pole), parallax (error in celestial coordinates due to earth orbit), and nutation (earth axis "nodding" on processional circle). Embodiments of the invention may include a temperature sensor for thermal error compensation of the magnetic and gravitational sensor arrays. The processor may compensate for unstable shaky hands of the operator in some embodiments of the invention.

An embodiment of the device may enable the database 62 to be updated with new information concerning celestial objects and the current magnetic pole location. This would be particularly useful for tracking artificial satellites where orbital elements can change based on mission requirements, for example, the Mir space station, the International Space Station, and the Hubble Space Telescope. This would also be useful for newly launched artificial satellites placed in orbit after the unit is in the field. For example, the Space Shuttle: This would also be useful for newly discovered celestial objects like comets and asteroids. Adding information about these celestial objects to the database may be accomplished by user entry, through an expansion chip or another type of plug-in module, or electronically, for example downloading from another computer through direct connection, over a telephone line, or via another type of information transfer system, such as a network or the Internet. For example, a modem port would allow the device to plug into the phone system, call a number, and update the database and magnetic north pole position online after the device was fielded. In another example, a wired or wireless connection to the internet or other information network would allow the user to download information about a particular star not initially in the locator's database or about a constellation of stars on a real time basis. Moreover, in conjunction with a telescope or binoculars, the internet connection may expand the locator's database; thus allowing the locator to find or identify objects difficult or impossible to see with the naked eye (such as fainter stars, comets, the space station, deep sky objects, or geographical locations on the moon).

Other embodiments of the invention, the COL device 10 would either come with astronomy tutorials in the database 62, in another database, in a plug-in module, downloadable from another computer either directly, over the telephone lines, or via another type of information transfer system, such as a network or the Internet. Thus, the database could be located partially or completely external to the device and accessed in real time during operation. In a similar fashion, downloadable constellation tours and sky tours may also be available in some embodiments of the invention.

In another embodiment of the invention, the COL device 10 could include calculations well known to those skilled in the art for notifying the operator of the next naked eye viewing opportunity for artificial satellites. For example the user could choose the International Space Station, then the COL device 10 could inform them of the next time the International Space Station would be visible with the naked eye.

In another embodiment of the invention, the COL device 10 may include a reflex viewer which would superimpose an illuminated reticule and direction indicators in the viewing area, allowing for the user 12 to hold the device further out from the eye. This would also prevent the user from observing through the viewing channel 46 too far off parallel to the viewing axis 34.

The COL device 10 is not limited to being of a hand-held size and there are many possible interpretations of hand-held size. In addition the COL device 10 may function on a much larger or smaller scale so the scope of the embodiments of the invention should not be limited to that of a hand-held size.

In alternative embodiments of the invention, the COL device 10 may have other input/output devices, other switches, other locations thereof, and many variations thereof, for example in number, arrangement, size, and type, including options wherein there are no input/output devices or switches on the housing 16. Non-limiting examples of such input/output devices naturally include telescopes, binoculars, or other means for viewing objects. Any input/output device may be mounted on the object locator, the object locator may be mounted on the input/output device, the object locator may be electrically or otherwise physically connected to the input/output device, or the object locator may be connected to the input/output device via a wired or wireless connection.

In another embodiment of the invention, a viewer or reflex viewer could be located outside the housing 16 in such a manner so as the user 12 may still sight parallel to the viewing axis.

In addition, a plurality of object locators, comprising student or slave devices, may be connected either by a cable or a wireless connection to a single object locator, comprising a teacher or master device. The orientation of the teacher device is relayed to the student devices, thus the student devices can point to the same object at which the teacher device is pointed. Note that it is possible to include a database only with the teacher device, thus reducing the expense of the student devices.

Another version of the device can be used as a means for locating a user on the Earth. In this embodiment the device does not have a global positioning satellite system reader and is thus less expensive. The user points the object locator at several known stars. The orientation information is then fed to the processor in tandem with the time and date. The processor then calculates, by triangulation, the current position of the user on the Earth.

Note that the object locator is capable of identifying non-celestial objects. For example, the object locator can use a database representing a topographical map. Thus, when the user points the locator at an object, such as a mountain peak, the locator identifies the object and may announce various facts about the object such as the object's height or name. In addition, the object locator can announce the current position of the user either on a particular map or on the Earth.

While the above description contains many specifics, these should not be construed as limitations on the scope of the device, but rather as an exemplification of one preferred embodiment thereof many other variations are possible. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A device for viewing an object, where the device is at a particular position on the Earth, at a time, and on a date, said device comprising:

a means for viewing the object, said means for viewing the object having a viewing axis;

a processor;

a means for determining the orientation of the device operably connected to the means for viewing the object, said means for determining the orientation of the device providing, to the processor, orientation data representing the orientation of the viewing axis;

a means for providing position data, representing the position of the device on the Earth, to the processor;

a means for providing time and date data, representing the time and date, to the processor; and a database operatively connected to the processor, said database containing data representing at least one fact regarding each of a plurality of objects and data representing the location of each of the plurality of objects when observed from a particular position on the Earth, at a particular viewing axis orientation, at a particular time, and on a particular date.

2. The device of claim 1 wherein the processor is capable of providing the at least one fact regarding the object when the orientation data, location data, time data, and date data match the database data for a particular object.

3. The device of claim 1, wherein the processor is programmed to respond to input regarding the orientation data, retrieve correlated information from the database, and transmit the correlated information to a speaker.

4. The device of claim 1, wherein the processor is programmed to respond to input regarding the orientation data, retrieve correlated information from the database, and transmit the correlated information to a visual display.

5. The device of claim 2 wherein the at least one fact is the name of the object.

6. The device of claim 2 further comprising:
a speaker for playing audio data, said speaker operably connected to the processor;
wherein the database contains audio data representing the at least one fact, and wherein the processor is capable of providing the audio data to the speaker such that a user hears an audio playback of the at least one fact.

7. The device of claim 1 further comprising:
direction indicators disposed within the means for viewing the object, said direction indicators operably connected to the processor;
wherein the direction indicators are operable to indicate the direction in which the means for viewing the object must be moved in order to orient the viewing axis towards a particular object selected from the plurality objects in the database.

8. The device of claim 7 further comprising:
a speaker for playing audio data, said speaker operably connected to the processor;
wherein the database contains audio data representing the at least one fact, and wherein the processor is capable of providing the audio data to the speaker such that a user hears an audio playback of the least one fact.

9. A device for viewing from a location at a time and date comprising:
a viewing means to observe along a viewing axis defined by an azimuth angle and a nadir angle;
a processor;
at least two gyroscopes operably connected to the viewing means and to the processor, said gyroscopes adapted to provide the processor with data representing the change in orientation of the viewing axis, wherein the processor therein uses the data representing the change in orientation of the viewing axis to calculate azimuth data representing the azimuth angle and nadir data representing the nadir angle;
a location means for providing location data representing the location to the processor;
a time means for providing time and date data representing the time and date to the processor; and
a database adapted to be accessed by the processor and provide data such that the processor determines celestial coordinates of right ascension and declination corresponding to the viewing axis based on the azimuth data, the nadir data, the location data, and the time and date data.

10. The device of claim 9 further comprising:
a speaker for playing audio data, said speaker operably connected to the processor;
wherein the database contains audio data representing at least one fact regarding an object at which the viewing axis points, and wherein the processor is capable of providing the audio data to the speaker such that a user hears an audio playback of the at least one fact.

11. A device for viewing from a location at a time and date comprising:
a viewing means to observe along a viewing axis defined by an azimuth angle and a nadir angle;
a processor;
at least two global positioning satellite system readers operably connected to the viewing means and to the processor, wherein the processor determines the orientation of the readers with respect to each other and thereafter uses the orientation of the readers with respect to each other to calculate azimuth data representing the azimuth angle and nadir data representing the nadir angle;
a location means for providing location data representing the location to the processor;
a time means for providing time and date data representing the time and date to the processor; and
a database adapted to be accessed by the processor and provide data such that the processor determines celestial coordinates of right ascension and declination corresponding to the viewing axis based on the azimuth data, the nadir data, the location data, and the time and date data.

12. The device of claim 11 further comprising:
a speaker for playing audio data, said speaker operably connected to the processor;
wherein the database contains audio data representing at least one fact regarding an object at which the viewing axis points, and wherein the processor is capable of providing the audio data to the speaker such that a user hears an audio playback of the at least one fact.

* * * * *